May 9, 1967 T. A. CUMMINS 3,318,172
POWER TRANSMISSION
Filed Feb. 8, 1965
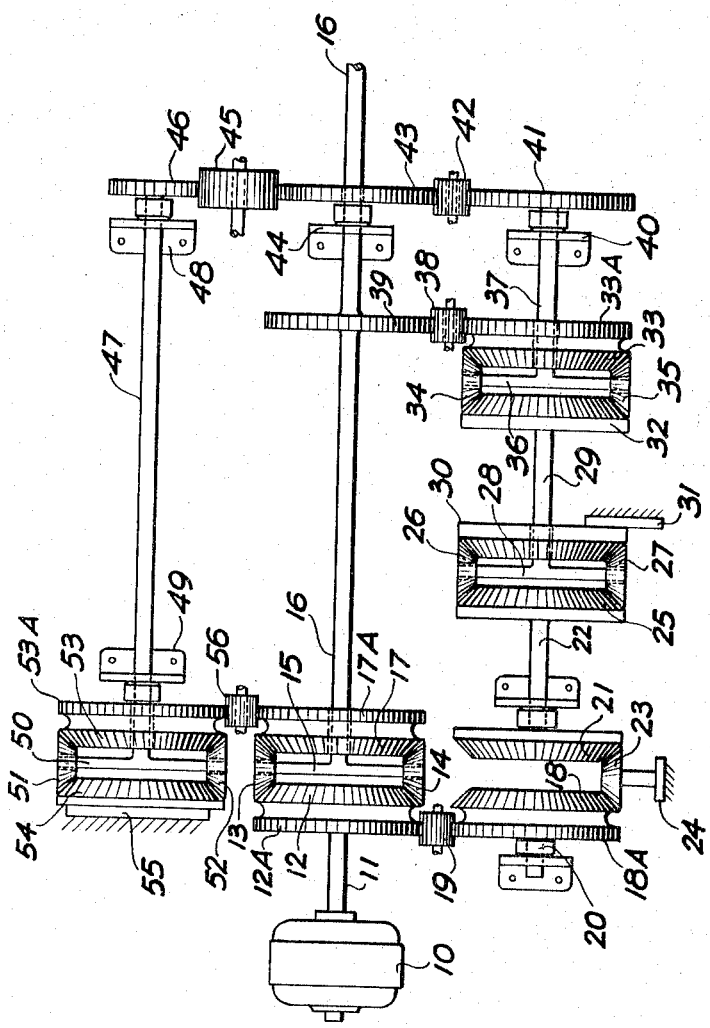
INVENTOR.
Thomas A. Cummins.
BY W. B. Hauffman
ATTORNEY.

United States Patent Office 3,318,172
Patented May 9, 1967

3,318,172
POWER TRANSMISSION
Thomas A. Cummins, 3848 Edinburgh, Drive,
Youngstown, Ohio 44511
Filed Feb. 8, 1965, Ser. No. 431,124
5 Claims. (Cl. 74—682)

This invention relates to a power transmission and more particularly to a self-regulating, infinitely variable speed transmission of the torque converter type.

The principal object of the invention is the provision of a power transmission of the torque converter type wherein the output will at all times be the minimum torque for any of various conditions of power input and load.

A further object of the invention is the provision of a power transmission that transmits power so that the output will be rotating at all times at the maximum speed for any given power input and load.

A still further object of the invention is the provision of a power transmission so arranged that when the input torque exceeds the resisting torque on the output, there will be an imbalance in the transmission and rotation of the output will begin.

A still further object of the invention is the provision of a power transmission that utilizes a plurality of differential gear sets in a mechanical arrangement.

A still further object of the invention is the provision of a power transmission wherein the ratio of the torque delivered through the transmission for any given condition of power and load is the inverse of the ratio of the revolutions of the input shaft of the transmission to the output shaft thereof multiplied by the input torque of the input shaft.

The power transmission disclosed herein provides a self-regulating, infinitely variable speed transmission of the torque converter type through the arrangement of a novel interconnecting of differential gear sets and drivingly connecting pinion gears arranged so that one of the differential gear sets is a sensing element arranged to feed motion and torque to another of the differential gear sets in an amount which exceeds the input, thereby achieving an equalizing torque factor.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

The figure is a schematic plan view of the power transmission.

By referring to the drawing, it will be seen that a power source comprising a motor 10 has been disclosed coupled to an input shaft 11 which in turn drives a bevel gear 12 with an integral pinion 12A. The bevel gear 12 is in mesh with bevel pinions 13 and 14, which are rotatably mounted on a pinion frame 15 which is integral with an output shaft 16. Assuming that there is very little power/torque applied to the input shaft 11 by the motor 10 and that there is no load on the output shaft 16, the power applied will be transmitted from the input shaft 11 to the output shaft 16 through the bevel pinions 13 and 14 as they rotate around bevel gear 17, which with its integral pinion 17A, is stationary, although bevel gear 17 and its integral pinion 17A are journalled for rotation on the output shaft 16 adjacent the pinion frame 15.

Positioned alongside the bevel gear 12 and its integral pinion 12A, there is a bevel gear 18 and integral pinion 18A. Both pinions 18A and 12A are in mesh with an intermediate pinion 19. Thus, the motion of the output shaft 11 is directly transmitted to the bevel gear 18 and the same is caused to revolve on a supporting stub shaft 20. Another bevel gear 21 is secured to a shaft 22 in spaced opposed relation to the bevel gear 18 and is interconnected therewith by a pinion 23 which is rotatably mounted on a fixed stub shaft 24. It will thus be seen that the bevel gear 18 will revolve in the same direction as the bevel gear 12 and that the bevel gear 21 will revolve in the opposite direction, together with the shaft 22. The shaft 22 is connected to a bevel gear 25. A pair of oppositely disposed pinion gears 26 and 27 are rotatably mounted on a pinion frame 28 which, in turn, is integrally connected with a shaft 29 on which a bevel gear 30 is mounted so as to journal the shaft 29. The bevel gear 30 is fixed by a mounting bracket 31 and the bevel pinion gears 26 and 27 are positioned so that they mesh with the bevel gear 25 and the bevel gear 30.

The shaft 29 is connected directly to a bevel gear 32 which is arranged in a differential setup including an oppositely disposed bevel gear 33 and beveled pinion gears 34 and 35. The bevel pinion gears 34 and 35 are rotatably mounted on a pinion frame 36, which, in turn, is integrally secured to a rotatable shaft 37 on which the bevel gear 33 is journalled. The bevel gear 33 has an integral pinion 33A which is in mesh with an intermediate pinion gear 38 and which pinion gear 38 is also in mesh with a pinion 39 on the output shaft 16 heretofore referred to. The pinion gear 39 is secured to the output shaft 16.

The rotatable shaft 37 extends through a supporting bushing 40 and is secured to a pinion 41 which is in mesh with an intermediate pinion 42 which, in turn, also meshes with a pinion 43 rotatably mounted on the output shaft 16.

A supporting journal 44 is positioned intermediate the pinions 39 and 43 so as to support the output shaft 16. Another intermediate pinion gear 45 is engaged on the opposite side of the pinion 43 and is also engaged with a pinion 46 which is fixed to a drive shaft 47 and which drive shaft 47 is supported by a pair of journals 48 and 49, respectively.

The drive shaft 47 has a pinion frame 50 on its opposite end with respect to the pinion 46, and so positioned that beveled pinion gears 51 and 52 journalled on the pinion frame 50 are positioned between a bevel gear 53 having integral pinion 53A which is rotatably mounted on the shaft 47 and a bevel gear 54 which is fixed to a stationary bracket 55. An intermediate pinion gear 56 is in mesh with the integral pinion 53A of the bevel gear 53 and the integral pinion 17A of the bevel gear 17 heretofore referred to.

It will be observed that the main differential is that comprising the bevel gears 12 and 17 and their meshing bevel pinion gears 13 and 14, and which differential includes the pinion frame 15 to which the output shaft is secured. It will further be seen as hereinafter referred to that a sensing differential is formed by the bevel gears 32 and 33 and their meshing bevel pinion gears 34 and 35 of the pinion frame 36 on which they are journalled.

It will thus be seen that there is a direct gear and shaft drivingly connected between the input shaft 11 and the output shaft 16 and it will be understood by those skilled in the art that the motion applied to the input shaft 11 by the motor 10 will be transmitted directly to the output shaft 16 when there is no load or resistance to the revolution of the output shaft 16. The motion is conveyed by the integral pinion 12A to the intermediate pinion 19 and the integral pinion 18A, and hence revolves the bevel gear 18, the beveled meshing pinion 23 being rotatable but otherwise fixed in its relative position between the bevel gear 18 and the bevel gear 21 simply reverses the motion and imparts it to the bevel gear 21. The bevel gear 21 is connected to and directly rotates the shaft 22 by means of which motion is imparted to the bevel gear 25, which revolves integrally with the shaft 22. The oppositely disposed bevel gear 30 is fixed by the bracket 31 and causes the bevel pinion gears 26 and 27 to rotate relative thereto and thus impart rotating motion to the shaft 29 which in turn conveys it to the bevel gear 32 which is integral therewith. The motion thus reaches the sensing differential, and since there is no resistance to the rotation of the output shaft 16, the motion is simply reversed by the bevel pinion gears 34 and 35 and imparted to the bevel pinion gear 30 and its integral pinion 33A which are rotatably mounted on the shaft 37. As the integral pinion 33A is in mesh with the intermediate pinion 38 and the pinion 39 which is secured to the output shaft 16, the motion travels to the shaft 16 and thus causes the same to revolve. It will be observed that the integral pinion gears 12A, 17A, 18A, 33A and 53A are of the same diameter and that the pinion gears 39, 41, 43 are of the same diameter and that pinion gear 46 has a diameter one-half that of pinion gear 41.

The sensing differential comprising the bevel gears 32, 33 and their interconnecting bevel pinion gears 34 and 35 feed back to the output shaft 16 and indirectly to the bevel gear 17 with its integral pinion 17A only the amount of torque by which the output exceeds the input under the stated conditions. This occurs since the input torque is imposed on the differential comprising the bevel gears 32 and 33 and their meshing bevel pinions 34 and 35 in a negative rotation relative to the main differential (which includes the bevel gears 12 and 17 and their meshing bevel pinions 13 and 14). Since the input torque is imposed in a negative rotation relative to the main differential or is being subtracted from the output torque, the resultant, which is fed back to the main differential, is the effective torque of the load.

It will occur to those skilled in the art that the effective torque can be in opposite or negative direction relative to the input. Under a condition where the load on the output shaft 16 exceeds the power input on the input shaft 11, the output shaft 16 will not turn and therefore the bevel gear 33 and its integral pinion 33A will not turn. The resultant which is fed back is equal to the input but with a negative rotation. The main differential which comprises the bevel gears 12, 15 and their meshing bevel pinions 13 and 14 will therefore have the same torque imposed on both sides of it but in opposite directions of rotation, and no movement of the output shaft will occur.

Those skilled in the art will observe that with the arrangement disclosed the bevel gear 17 may revolve in a negative direction relative to the bevel gear 12. It is a positively acting gear and affords a base against which the bevel pinions 13 and 14 can and will react. When the input torque exceeds the restricting torque, there will be an imbalance in this main differential and rotation of the output shaft 16 will start. Any change in the speed of rotation of the output shaft causes simultaneously a change in the speed of rotation of the bevel gear 17 in the main differential, which change occurs through the path of feedback as hereinbefore explained, and which is in effect changing the ratio of the power transmitted. The power transmission then transmits power so that the output shaft 16 will be rotating at all times at the maximum speed (minimum torque) for any given power input and load.

It will occur to those skilled in the art that the power transmission disclosed herein works using a feedback without self-binding because only the output in excess of input is fed back to the main differential as above described.

It will thus be seen that the ratio of the torque delivered through the power transmission for any given condition of power and load is the inverse of the ratio of the revolutions on input shaft 11 to the revolutions of the output shaft 16 multiplied by the input torque of the shaft 11.

It will thus be seen that a power transmission meeting the several objects of the invention has been disclosed and having thus described my invention, what I claim is:

1. A power transmission having a drive shaft and a driven shaft and mechanical proportional mechanism interconnecting the same including a first differential having a plurality of interrelated elements with an input element connected to said drive shaft and an output element connected to said driven shaft, a second shaft, a gear set having a plurality of interrelated elements with an input element drivingly connected to said drive shaft and an output element connected to said second shaft, one of said interrelated elements being rotatably arranged on a fixed support, a third shaft, a second gear set having a plurality of interrelated elements with an input element connected to said second shaft and an output element connected to said third shaft, one of said interrelated elements being fixed against rotation, a fourth shaft, a second differential having a plurality of interrelated elements with an input element connected to said third shaft and an output element connected to said fourth shaft, one of said interrelated elements drivingly connected to said driven shaft, a fifth shaft, means drivingly connecting said fourth and fifth shafts, a third gear set having a plurality of interrelated elements, with an input element connected to said fifth shaft and an output element drivingly connected to a third element of said first differential and one of said interrelated elements being fixed against rotation.

2. The power transmission set forth in claim 1 and wherein the output element in the first differential comprises a pinion frame having a pair of beveled pinions thereon rotatably engaging said input element and one of said interrelated elements.

3. The power transmission set forth in claim 1 and wherein the output element in the first differential comprises a pinion frame having a pair of beveled pinions thereon rotatably engaging said input element and one of said interrelated elements and wherein said output element of said second gear set has a pinion frame with a pair of beveled pinions thereon rotatably engaged with said input element and said fixed interrelated element.

4. The power transmission set forth in claim 1 and wherein the output element in the first differential comprises a pinion frame having a pair of beveled pinions thereon rotatably engaging said input element and one of said interrelated elements and wherein said output element of said second gear set has a pinion frame with a pair of beveled pinions thereon rotatably engaged with said input element and said fixed interrelated element, and wherein the output element of said second differential comprises a pinion frame having a pair of beveled pinions thereon rotatably engaged with said input element.

5. The power transmission set forth in claim 1 and wherein the output element in the first differential comprises a pinion frame having a pair of beveled pinions thereon rotatably engaging said input element and one of said interrelated elements and wherein said output element of said second gear set has a pinion frame with a pair of beveled pinions thereon rotatably engaged with said input element and said fixed interrelated element, and wherein the output element of said second differential comprises a pinion frame having a pair of beveled pinions thereon rotatably engaged with said input element, and wherein the input element of said third gear set comprises a pinion frame having a pair of beveled pinions thereon rotatably engaging said output element and said fixed interrelated element.

References Cited by the Examiner

FOREIGN PATENTS

| | | |
|---|---|---|
| 427,754 | 4/1935 | Great Britain. |
| 510,337 | 1/1955 | Italy. |

DONLEY J. STOCKING, *Primary Examiner.*

DAVID J. WILLIAMOWSKY, *Examiner.*

J. R. BENEFIEL, *Assistant Examiner.*